United States Patent [19]

Logsdon

[11] 4,442,994
[45] Apr. 17, 1984

[54] PIPE HANGER CAPABLE OF TOTALLY ENCIRCLING A PIPE

[76] Inventor: Duane D. Logsdon, P.O. Box 186, Stanton, Calif. 90680

[21] Appl. No.: 345,198

[22] Filed: Feb. 2, 1982

[51] Int. Cl.³ ............................................ F16M 13/00
[52] U.S. Cl. ....................................... 248/547; 24/24; 248/74.3
[58] Field of Search ................ 248/547, 74 A, 74 PB, 248/74 R, 73, 71; 24/24, 16 PB, 17 AP

[56] References Cited

U.S. PATENT DOCUMENTS

| | | | |
|---|---|---|---|
| 2,371,210 | 3/1945 | Atkinson | 248/216.1 |
| 2,994,499 | 8/1961 | Waters | 248/74 B |
| 3,341,651 | 9/1967 | Odegaard | 248/74 PB |
| 3,471,109 | 10/1969 | Meyer | 248/74 PB |
| 3,515,363 | 6/1970 | Fisher | 248/71 |
| 3,684,223 | 8/1972 | Logsdon | 248/74 PB |
| 3,807,675 | 4/1974 | Seckerson et al. | 248/74 A |
| 3,954,238 | 5/1976 | Nivet | 248/74 PB |
| 4,148,113 | 4/1979 | Dvorachek | 248/74 PB |
| 4,260,122 | 4/1981 | Fiala | 248/71 |
| 4,260,123 | 4/1981 | Ismert | 248/71 |

Primary Examiner—Ramon S. Britts
Assistant Examiner—Ramon O. Ramirez
Attorney, Agent, or Firm—K. H. Boswell; Edward D. O'Brian

[57] ABSTRACT

A pipe clamp is formed with a body and the body includes a wall. The wall is formed as a loop which completely surrounds an aperture except for an interstice opening through the wall into the aperture. The portions of the wall located on either side of the interstice forms first and second wall ends. The body also includes a foot joined to the wall. A discontinuous passageway passes through the first and second wall ends and through the foot. This passageway is capable of receiving an object such as a nail. The size of the nail utilized is such that its length is greater than the length of the passageway such that when the nail is located within the passageway a portion of the nail is capable of holding the first and second wall ends together in fixed association and a further portion of the nail is capable of extending out of the passageway beyond the foot. The portion of the nail extending out of the passageway beyond the foot is capable of being driven into a support surface to hold the body to the support surface when the foot of the body is abutted against the support surface. The portion of the nail holding the first and second end walls together is capable of maintaining a pipe fixedly held within the hanger.

7 Claims, 5 Drawing Figures

U.S. Patent    Apr. 17, 1984    4,442,994
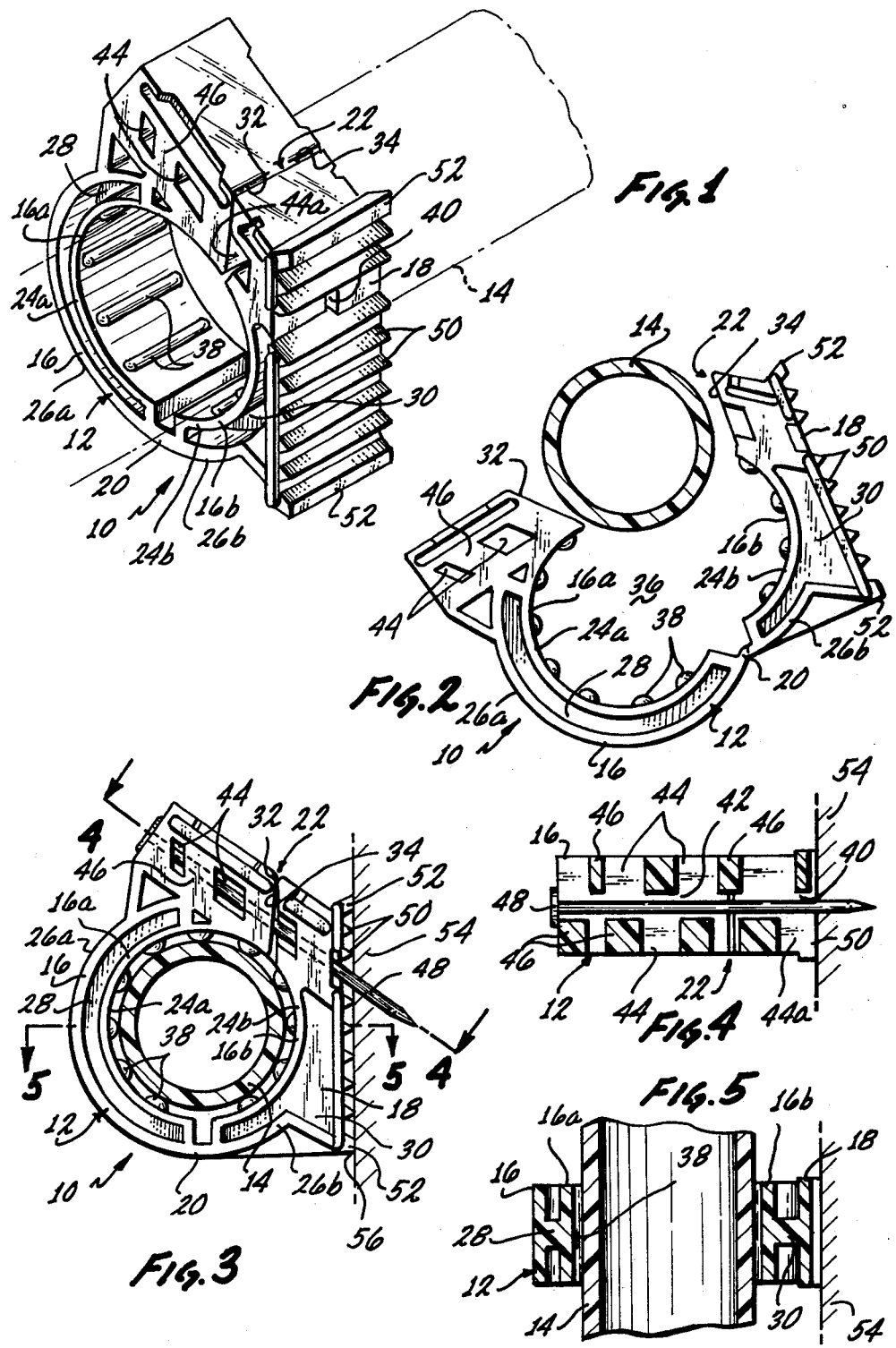

PIPE HANGER CAPABLE OF TOTALLY ENCIRCLING A PIPE

BACKGROUND OF THE INVENTION

This invention is directed to a pipe hanger capable of completely encircling a pipe to fixedly hold a pipe in the pipe hanger. Furthermore, the pipe hanger is capable of being attached to a support surface in a manner which retards removal of the pipe hanger from the support surface. Both the encircling and the hanging aspects of the pipe hanger are accomplished utilizing a single, elongated sharp object such as a nail or the like, which passes through a passageway within the pipe hanger to maintain the pipe hanger around the pipe and to maintain the pipe hanger in the support surface.

In the plumbing arts there are several common ways of supporting pipes from both vertical and horizontal surfaces. The standard of the industry for years was the use of what is called "plumber's tape." This is a soft steel strap having a plurality of holes spaced in a regular pattern along its length. Generally, these holes would be spaced within an inch or so of one another. To use, a section of the strap was cut off using a tin snips or other object capable of cutting through metal, and the strap was then nailed, screwed or otherwise fastened to the supporting structure. The use of such plumber's tape had several defects. Most of these were related to the fact that the plumber's tape is metallic and contacts a metallic pipe. Because of this, electrolysis between the pipe and the tape any any metallic support surface was always possible. Furthermore, corrosion at the point where the pipe attached to the tape could occur during the lifetime of the use of the pipe.

Within the last decade or so, with the widespread use of plastic pipe, many systems have come into being which utilize devices formed of plastic and the like for assisting in mounting pipes to both horizontal and vertical support surfaces, as well as attaching them to walls and the like, wherein the pipe passes through the wall. As representative examples of these newer methods of attaching pipes, U.S. Pat. No. 3,684,220 and U.S. Pat. No. 3,684,223 can be cited. The U.S. Pat. No. 3,684,220 patent is directed to a pipe holder which holds the pipe in a fixed relationship to a wall wherein the pipe passes through the wall. This device finds its greatest utility wherein a pipe is located in a wall and must pass through one or more of the studs supporting the wall. The other noted U.S. Pat., No. 3,684,223 is directed to a pipe clamp by which pipes can be supported against both vertical and horizontal surfaces. This clamp is very utilitarian in its nature; however, it requires the use of two nails to fasten it to a wall, and since both of these nails are driven straight into the wall, the possibility exists that the nails, under the weight of the pipe and its contents, could be pulled free of the wall.

The incorporation of new materials to plumbing supplies has caused a minor revolution within the plumbing industry as of late. Plastic pipe and the like are susceptible to being manufactured using mass production techniques, thus maintaining their relatively low cost. Unfortunately, labor costs have not kept the same pace as material costs. Quite to the contrary, labor costs in the plumbing industry continue to escalate. The majority of the ultimate cost to the consumer for any plumbing project lies in the labor costs in completing the construction of the plumbing, and not in the supplies themselves. It is therefore evident that if the costs of providing plumbing services are to be maintained on an economical scale, that anything which can reduce the labor costs would result in an ultimate savings to the consumer.

In view of the above, it is a broad object of this invention to provide a pipe hanger which, because of its construction and engineering, is extremely easily and efficiently used by the plumber, and thus can be mounted on a wall or the like in a minimum of time, resulting in labor savings in its use. It is a further object to provide such a pipe hanger which, because of its construction, is capable of a long service life with no maintainence, and thus provides a further savings because of these virtues. It is a further object to provide a pipe hanger which has no open areas and is capable of completely encircling a pipe such that the pipe is fixedly held in the hanger and would be maintained in its position once it is located there.

These and other objects, as will become evident from the remainder of this specification, are achieved in a pipe hanger capable of being attached to a support surface which comprises a body, said body having a wall, said wall formed as a loop surrounding an aperture, said wall including an interstice opening into said aperture, the portions of said wall located adjacent to said interstice forming a first wall end and a second wall end; said wall including at least one area of flexure such that said first and said second wall ends can be moved with respect to one another to increase and decrease the size of said interstice; said body including a foot joined to said wall; said body including a discontinuous passageway passing through said second wall end, said first wall end and said foot, said passageway capable of receiving an elongated essentially cylindrical fastening means of a greater length than the length of said passageway and when said fastening menas is located in said passageway a portion of said fastening means holding said first and said second wall ends in fixed association with one another, and a further portion of said fastening means extending from said passageway beyond said foot and into said support surface to hold said body fixedly fastened to said support surface when said body is located with said foot abutting against said support surface.

Preferredly, the first wall end will be located in association with the foot and the passageway will be oriented with respect to at least a portion of the foot such that when the fastening means is located in the passageway a portion of the fastening means will extend beyond the foot and will be located at an acute angle with respect to at least that portion of the foot.

Preferredly, the foot will be an essentially elongated, flat planar surface, having a pair of ends and a pair of elongated sides joining the ends. The first end wall will be located proximal to one of the ends. A plurality of ridges will extend traversely between the sides of the foot to provide a no-slip grip to the supporting surface.

Preferredly, the aperture is essentially circular in shape for use in supporting water pipes and the like. Other shapes, however, would be useful for supporting square, rectangular and other shape pipe.

Preferredly, the area of flexure will be a single area located distal from the interstice such that when the end walls of the hanger are separated from each other, the wall will pivot about the area of flexure to allow easy insertion of a pipe within the aperture.

In the preferred embodiment, a plurality of protrusions are located along the interior of the wall and project into the aperture. These plurality of protrusions are capable of contacting the outside surface of a pipe when the pipe is located within the aperture and face the pipe away from the wall of the pipe hanger. This results in both a reduction of noise and vibration propogation from the pipe to the pipe hanger and to the supporting surface.

BRIEF DESCRIPTION OF THE DRAWING

The invention described in this specification will be better understood when taken in conjunction with the drawing wherein:

FIG. 1 is an oblique view showing location of the pipe hanger of this invention around a pipe, which is shown in phantom lines;

FIG. 2 is a side elevational view showing a pipe in section and the pipe hanger of the invention oriented for insertion of the pipe into the pipe hanger;

FIG. 3 is a side elevational view showing a pipe in section with the pipe hanger of the invention encircling the pipe and mounted to a supporting surface;

FIG. 4 is a sectional view about the lines 4—4 of FIG. 3 and

FIG. 5 is a sectional view of line 5—5 of FIG. 3.

This invention utilizes certain principals and/or concepts as are set forth in the claims appended to this specification. Those skilled in the plumbing arts will realize that these principals and/or concepts are capable of being expressed in a variety of different embodiments of the invention. For this reason, this invention is not to be construed to be solely limited to the illustrated embodiment shown herein to illustrate the invention, but to be construed only in view of the claims appended hereto.

DETAILED DESCRIPTION OF THE INVENTION

The pipe hanger 10 of the invention is formed as an integrally formed body 12. This one piece body 12 can be formed by suitable injection molding techniques or the like, in a variety of sizes to fit different diameter pipes or other objects for which it is desirous to suspend, hang or the like. Normally, the pipe hanger 10 would be formed of suitable plastic material; however, other materials could be utilized by some modifying of the production techniques, as would be evident to the art skilled, given the disclosure herein.

For illustrative purposes, the pipe hanger 10 is shown used with a round pipe 14. Other shapes could be utilized, other than the round shape as illustrated by simple modification of the appropriate shape of the pipe hanger 10. Thus, for example, the pipe hanger 10 could be made such that a rectangular or square shaped object could be suspended. For its primary purpose, however, of suspending water pipes and the like, the round shape, as illustrated is the preferred shape.

The body 12 is formed such that certain component parts, as hereinafter identified, are formed in such a manner to provide a high degree of strength to the pipe hanger 10 without undue bulk. As will be evident from the description below, certain portions of the body 12 of the pipe hanger 10 incorporate component parts which meet each other at right or normal angles, and thus provide the above noted high degree of strength without having to form the body 12 of a solid construction. A solid construction, however, could be utilized. However, the construction as depicted in the drawings described herein is the preferred construction.

The body 12 can be subdivided into two main areas. These are a wall portion 16 and a foot portion 18. The wall portion 16 is subdivided into an outside section 16a and an inside section 16b as can best be seen in FIG. 2. These are divided by an area of flexure 20 and an interstice area 22. The sections of the wall 16a and 16b can be moved with respect to one another by flexing the wall 16 at the area of flexure 20. This enlarges or contracts the interstice area 22, depending upon the relative movement of the two sections of the wall 16 with respect to one another.

Along section 16a of the wall 16, the wall is formed with an interior partition 24a and an exterior partition 26a. These are joined together by cross partition 28. Along the section of the wall 16b, the wall 16 is formed by the interior partition 24b and along a short segment of its circumference by an exterior partition 26b. Along the remainder of the section of the wall 16b, the exterior partition 26b is missing and is replaced by the foot 18. The interior partition 24b is joined to the exterior partition 26b and the foot 18 by the cross partition 30. The area of flexure 20 is located in the exterior partition 26 and at the area the interior partition 24 meets with and joins the exterior partition 26.

The area of the wall 16 on either side of the interstice area 22 forms a first wall end 32 and a second wall end 34. The first wall end 32 joins both the wall 16 and the foot 18. As can be seen in FIGS. 1 and 3 the two wall ends 32 and 34 can be brought into close alignment with one another, decreasing the interstice area 22 to a minimum or, as seen in FIG. 2, the wall ends 32 and 34 can be separated from one another, increasing interstice area 22 such that the pipe 14 can pass through the interstice area 22 to be located within the aperture 36 formed by the wall 16.

Spaced along the interior partition 24 of the wall 16 are a plurality of identical projections, collectively identified by the numeral 38. These project into the aperture area 36 and when the pipe 14 is located in the aperture area 36 and the first and second end walls 32 and 34 brought together, the pipe 14 is cradled by the projections 38. This cradling of the pipe 14 by the projections 38 fixedly hold the pipe in the pipe hanger 10, inhibit moisture transfer from the outside surface of the pipe 14 to the pipe hanger 10 and thus to the supporting surface, and inhibit noise propogation from the pipe 14 through the pipe hanger 10 to a supporting surface. Additionally, since the pipe hanger 10 and the projections 38 located thereon are preferredly made of a plastic material, the combination of projections 38 and the spaces between the same allows for some cold flow of this material from the projections 38 when the pipe hanger 10 is squeezed tightly around the pipe 14. This makes for an intimate contact between the pipe 14 and the pipe hanger 10. Furthermore, the possibility of cold flow of the material of the projections 38 allows for securely abutting the first and second wall ends 32 and 34 to each other when the pipe 14 is located within the aperture 36.

It is evident from the drawings that the second wall end 34 is what can be termed as "beefed up." That is to say, a significant amount of the total mass of the pipe hanger 10 is located at this area. When the pipe hanger 10 is installed as indicated below, installation is normally accomplished with a hammer. By incorporating additional material at the second wall end 34 as is shown, an area of impact to absorb some of the shock of the final hammer blow is built into the pipe hanger 10.

This prevents distortion of the remaining portion of the pipe hanger 10, most notably, the wall 16 and foot 18.

Passing through both the first end wall 32 and the second end wall 34 as well as through an opening 40 in the foot 18 is a passageway 42. The passageway 42 is discontinuous between the two end walls 32 and 34 in the area of the interstice area 22. As is best seen in FIGS. 3 and 4 the passageway 42 is formed by locating on alternate sides of the body 12 in the end wall areas 32 and 34 a plurality of alternating voids collectively identified by the numeral 44 and areas of material collectively identified by the numeral 46. By having the areas of material 46 traverse less than one half of the thickness of the body 12, whereas the voids 44 traverse more than one half of the thickness of the body 12, the passageway 42 can be conveniently formed during molding of the pipe 10, without the requirement of a separate drilling operation to form the same. The opening 40 is provided by having one of the voids 44a traverse across a portion of the face of the foot 18.

The passageway 42 is sized to accept an elongated, cylindrical fastening means such as the common nail illustrated in FIGS. 3 and 4. The use of such a nail is the preferred fastening and attaching means for use with the pipe hanger 10. Alternately, other elongated fastening means could be used, such as what are commonly referred to as "dry wall" nails. These nails contain a plurality of ridges along the length of the shaft of the nail. Other fasteners which could be used could include elongated screws which have essentially a constant cross section and very small threads thereon. In any event, the passageway 42 is sized and shaped to accept an elongated fastening means, preferredly a common, elongated nail.

As is evident from viewing FIG. 3, preferredly the passageway 42 is set at an angle with respect to the foot 18. In FIG. 3, moving in a counter-clockwise direction from the nail 48 to the portion of the foot 18 located below the opening 40, it can be seen that the passageway 42 makes an obtuse angle. Additionally, moving clockwise from the nail 48 to the uppermost portion of the foot 18, it can be seen that the passageway 42 makes an acute angle with the upper portion of the foot at this area. Because the passageway 42 is so set with respect to the foot 18 in the preferred embodiment of the invention, when the nail 48 is located within the passageway 42, the portion of the nail 48 extending out beyond the foot 18 makes an acute angle, with the major portion of the foot 18 located below the opening 40. This acute angle assists in achieving certain functions of the preferred embodiment of the pipe hanger 10 as is set forth below.

Located along the foot 18 which preferredly is formed as a rectangular planar surface, are a plurality of interior ridges, collectively identified by the numeral 50, and two exterior ridges, collectively identified by the numeral 52. The ridges 50 are triangular in shape in cross section, whereas the ridges 52 are rectilinear in shape. In combination, the ridges 50 and 52 provide for a strong grip of the foot 18 against a support surface, such as support surface 54 shown in FIGS. 3, 4 and 5. If this support surface 54 is a soft surface, such as a wood 2×4 or the like, the ridges 50 and 52 actually can be driven into this surface to form a cleatlike attachment of the foot 18 with the surface. The ridges 50 and 52 traverse between the two outside edges of the foot 18 as can be seen in FIG. 1.

Pipe hanger 10 is used as follows: The first and second wall ends 32 and 34 are displaced away from each other, opening up the interstice area, such that the pipe hanger 10 can be slipped around the pipe 14. The two ends 32 and 34 are then brought together to safely snuggle the pipe 14 in the body of the pipe hanger 12 within the confines of the wall 16. The pipe hanger 10 is then brought against the support structure 54 and a nail 48 inserted therein. The nail 48 is driven into the support surface 54, fixedly attaching the pipe hanger 10 and the pipe 14 located therein to this support surface. It is evident from looking at FIG. 3 that the angle of the nail 48 within the passageway 42 assists in attaching the pipe hanger 10 to the support surface because this angle is so located that as the hammer utilized by the person installing the pipe hanger 10 goes through an arc and strikes the nail head on the nail 48, the nail 48 is essentially at a tangent to the arc, allowing for holding of the hammer in a relaxed manner. It is evident that if the nail has to be driven straight into the wall, the end of the hammer away from the head must be located closer to the wall than if the hammer can go through a gentle arc and strike against a nail 48 held at an angle to the support surface 54.

Once the nail 48 is driven into the support surface 54 and the nail head comes to rest against the second end wall 34, the last hammer blow assists in pushing the ridges 50 and 52 into the support surface if this support surface is of a soft material and any residual energy imparted to the nail head is taken up by the mass of the second end wall 34 and is not transferred to the remainder of the body 12 of the pipe hanger 10 distorting the same. The ridges 50 and 52 assist in maintaining the position of the foot 18 against the support surface in combination with the nail 48, which is now located into the support surface 54.

The positioning of the nail 48 into the passageway 42 prevents the first and second wall ends 32 and 34 from spreading with respect to one another, and thus maintains the cross-sectional section of the aperture 36 in almost a perfect circle to fixedly maintain the pipe 14 in its location within the pipe hanger 10. As is evident from comparing FIGS. 2 and 3, the portions of the passageway 42 located in the respective first and second wall ends 32 and 34 are only aligned in an axial manner when the first and second wall ends 32 and 34 are snugged up one against the other. Because of the presence of the rigid elongated nail 48 within the passageway 42, this assists maintaining the two wall ends 32 and 34 in their abutting relationship. It is quite evident that, by placing the area of flexure 20, i.e., the pivot point between the two sections of the wall 16, away from the interstice area 22, that the nail 48 serves as a locking mechanism to maintain the pipe hanger 10 closed around the pipe 16. Once the nail 48 is in place in the passageway 42, it is evident that the pipe hanger 10 cannot be opened, allowing for movement of the pipe 14 from within its confines.

It is evident from viewing FIG. 3 that once the pipe hanger 10 is mounted to the support structure 48, that any rotation of the pipe hanger 10 about the nail 48 will move the lowermost end 56 of the foot 18 into the plane of the support surface 54. Thus, any rotation of the pipe hanger 10 actually tightens the grip between this lowermost end 56 and the support surface. This assists in deterring rotation of the pipe hanger 10 about the support surface 54 when the pipe hanger 10 is so mounted thereon. The prevention of rotation about the axis of the nail 48 thus prevents rotation of the pipe hanger 10 and prevents the introduction of stress between the pipe hanger 10 and the pipe 14 by such rotation. Furthermore, the angle of the nail 48 into the support surface 54 assists in reducing the length of the lever arm of the end 56 of the foot 18, such that weight of the pipe 14 and its contents is better supported and a greater force is necessary to cause the nail 48 to be pulled from the support surface 54.

I claim:

1. A pipe hanger capable of being attached to a support surface which comprises:

a body, said body having a wall, said wall formed as a loop surrounding an aperture, said wall including an interstice opening into said aperture, the portions of said wall located adjacent to said interstice forming a first wall end and a second wall end;

said body including a foot joined to said wall, said first wall end located in association with said foot;

said body including a passageway having a first portion passing through said second wall end and a second portion passing through said first wall end and said foot, said passageway capable of receiving an elongated essentially cylindrical fastening means of a greater length than the length of said passageway and when said fastening means is located in said passageway a portion of said fastening means holding said first and said second wall ends in fixed association with one another and a further portion of said fastening means extending from said passageway beyond said foot and into said support surface to hold said body fixedly fastened to said support surface when said body is located with said foot abutting against said support surface;

said passageway being oriented acutely with respect to at least a portion of said foot such that when said fastening means is located in said passageway said portion of said fastening means extending beyond said foot is located at an acute angle with respect to at least said portion of said foot.

2. The pipe hanger of claim 1 wherein:

said foot is essentialy planar such that it is capable of abutting against a flat support surface.

3. The pipe hanger of claim 2 wherein:

said foot is an essentially elongated planar surface having a pair of ends joined by a pair of elongated sides and including said first wall end being located proximal to one of said ends of said foot.

4. The pipe hanger of claim 3 wherein:

said foot includes a plurality of ridges extending transversely between said sides of said foot.

5. The pipe hanger of claim 4 wherein:

said aperture is essentially circular in shape when said first and said second wall ends are located adjacent to one another.

6. The pipe hanger of claim 5 including:

said area of flexure being located closer to the other of said ends of said foot.

7. The pipe hanger of claim 6 including:

a plurality of protrusions located on the interior of said wall and projecting into said aperture, said plurality of protrusions capable of contacting the outside surface of a pipe when said pipe is located within said aperture, the plurality of protrusions spacing said outside surface of said pipe from said wall.

* * * * *